United States Patent

Lee

[11] Patent Number: 5,906,452
[45] Date of Patent: May 25, 1999

[54] MECHANISM FOR FOLDING A BICYCLE

[76] Inventor: Gin Chaung Lee, Room No. A, 3F., No. 112, Sec. 2, Chung Shan N. Rd., Taipei, Taiwan

[21] Appl. No.: 08/758,995

[22] Filed: Dec. 2, 1996

[51] Int. Cl.⁶ .................................................. F16B 2/18
[52] U.S. Cl. .......................... 403/325; 403/338; 74/551.3; 280/278
[58] Field of Search ..................... 403/321, 322, 403/323, 325, 338, 335, 4; 280/420, 278, 287; 74/551.3, 551.1

[56] References Cited

U.S. PATENT DOCUMENTS

| | | | |
|---|---|---|---|
| 4,491,337 | 1/1985 | Zuck | 403/4 X |
| 5,301,972 | 4/1994 | Lee | 280/278 |
| 5,337,609 | 8/1994 | Hsu | 74/551.3 |
| 5,440,948 | 8/1995 | Cheng | 403/322 X |
| 5,492,350 | 2/1996 | Pan | 403/322 X |

*Primary Examiner*—Harry C. Kim
*Attorney, Agent, or Firm*—David and Raymond; Raymond Y. Chan

[57] ABSTRACT

A mechanism for folding a bicycle according to the invention comprises an upper grip, a lower grip, an upper tube base, a lower tube base and an adjustable set pin. By the connecting pin, the upper grip is able to turn around on the lower grip, and a handle, a pulling eye and a hook are provided with the upper grip. When folding, let the contact rim of the adjustable set pin in contact with the depressed surface, then pull the upper grip upwards with a finger inserting into the pulling eye and against the resistive force of the spring, bring the hook to engage it with the hanger provide on the upper tube base latching closely together the upper and lower tube bases. In case of unfolding, insert a finger into the pulling eye and pull it upwards and outwards simultaneously and forcefully. The mechanism according to the invention assures easy and prompt for folding or unfolding the frame of a bicycle with simple and secure construction.

1 Claim, 3 Drawing Sheets

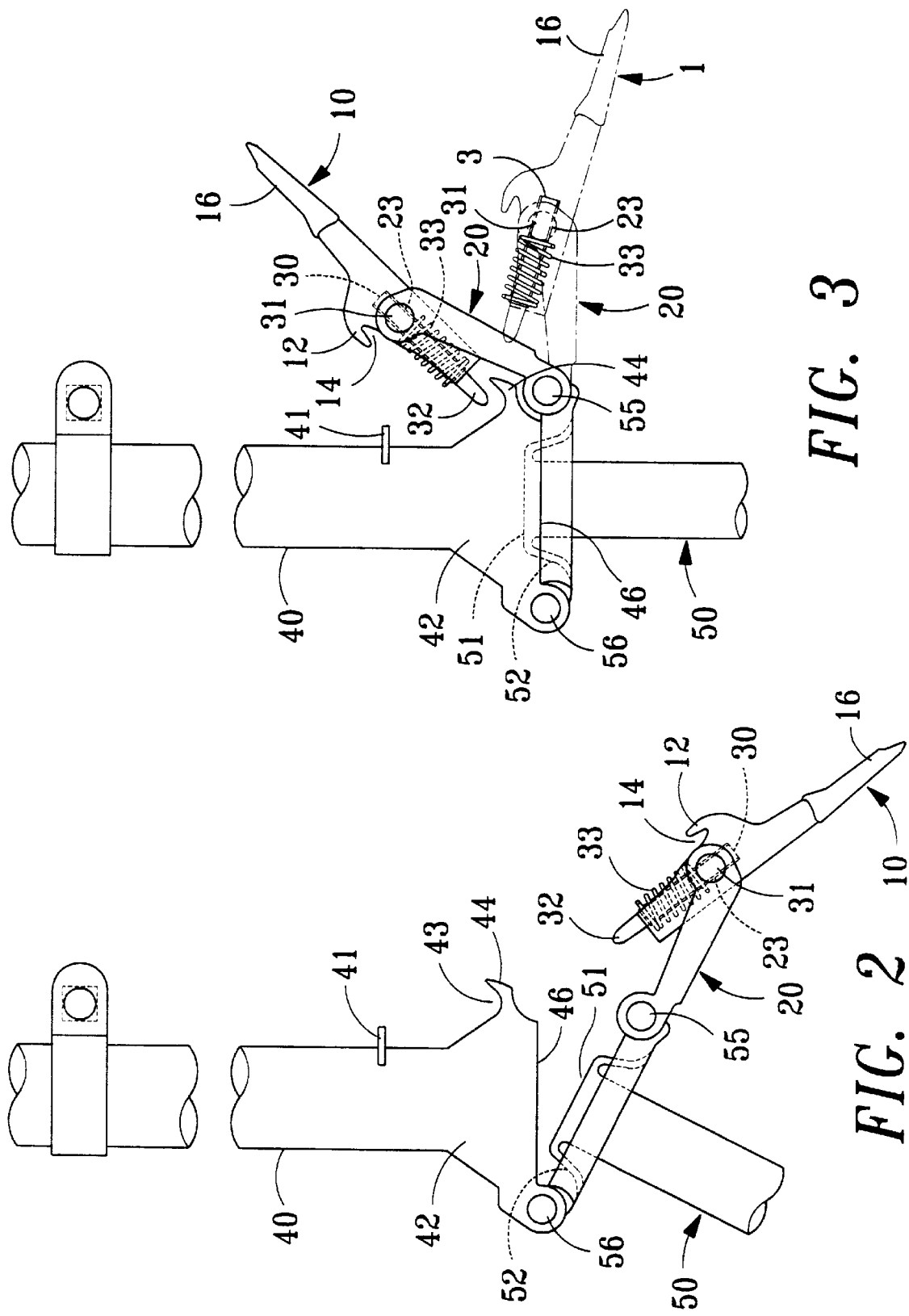

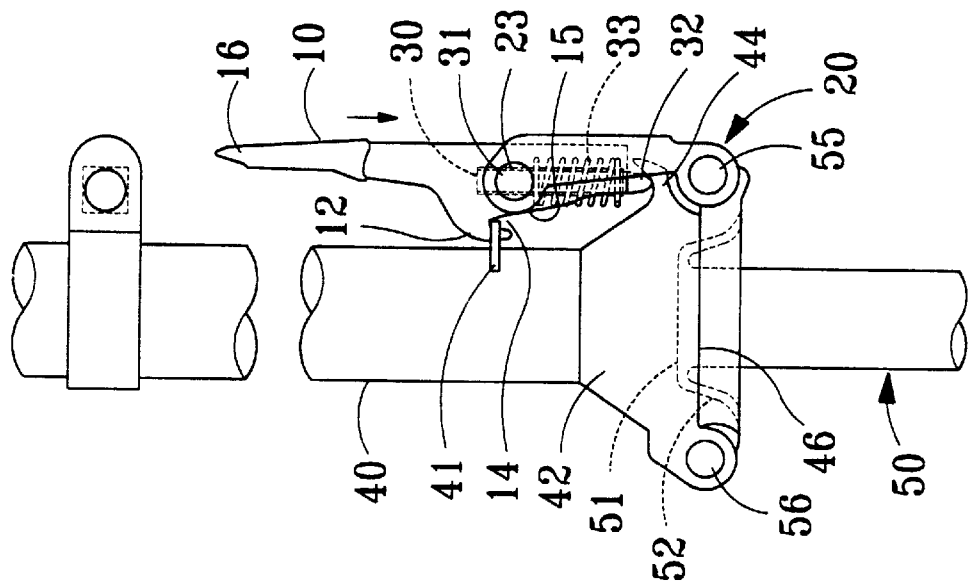
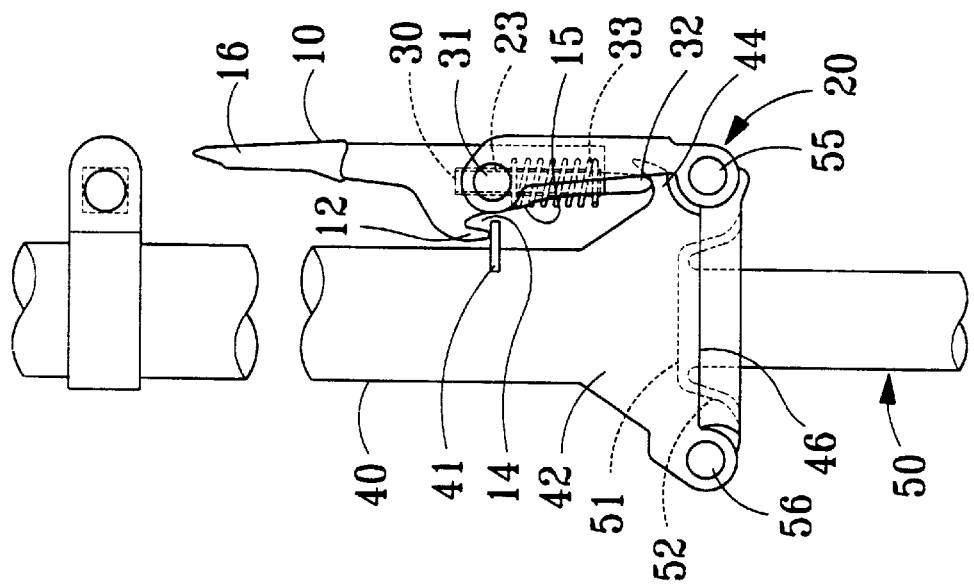

MECHANISM FOR FOLDING A BICYCLE

BACKGROUND OF THE INVENTION

1. Field of the Invention

The present invention relates to a mechanism for folding a bicycle which is simple in construction yet easy for folding and unfolding without using any tools.

2. Description of the Prior Art

At present, a bicycle with foldable frame becomes very popular and welcomes by the users. However, tightening with screw is generally employed as a method for folding its frame causing the necessity of using tools for folding and taking apart that is inconvenient to the users. In addition, the construction of the conventional bicycle folder is rather complicated, and its production cost is high even though it does not have any means for assuring security.

SUMMARY OF THE INVENTION

In view of the fact that tightening means of the conventional bicycle folder have the above described disadvantages that should be rectified. The patent applicant of the present invention developed an innovative latch mechanism for the bicycle frame folder and granted for U.S. Pat. No. 5,301,972 by the name "BICYCLE FRAME FOLDER" in 1993. From then on the applicant has been continuing his study on the bicycle frame folder for the benefit of the users and come out with a more convenient folder for folding, unfolding and latching.

The advantageous features of the folder according to the invention are:

1. Simple in construction, convenient for handling and low production cost.
2. Free from loosening by vibration when in folded state assuring perfect security.
3. Both upper and lower grips making the operation of folding and unfolding easy and prompt.

BRIEF DESCRIPTION OF THE DRAWINGS

The invention, as well as its many advantages, may be further understood by the following detailed description and drawings in which:

FIG. 2 is a view showing the profile of the folder before folding in the preferred embodiment according to the invention;

FIG. 3 is a view showing the adjustable set pin stopping on the depressed surface in the preferred embodiment according to the invention;

FIG. 4 is a view showing the hook coming to the position above the hanger in the preferred embodiment according to the invention; and FIG. 5 is a view showing the folder in complete folding state in the preferred embodiment according to the invention.

Figure 1:
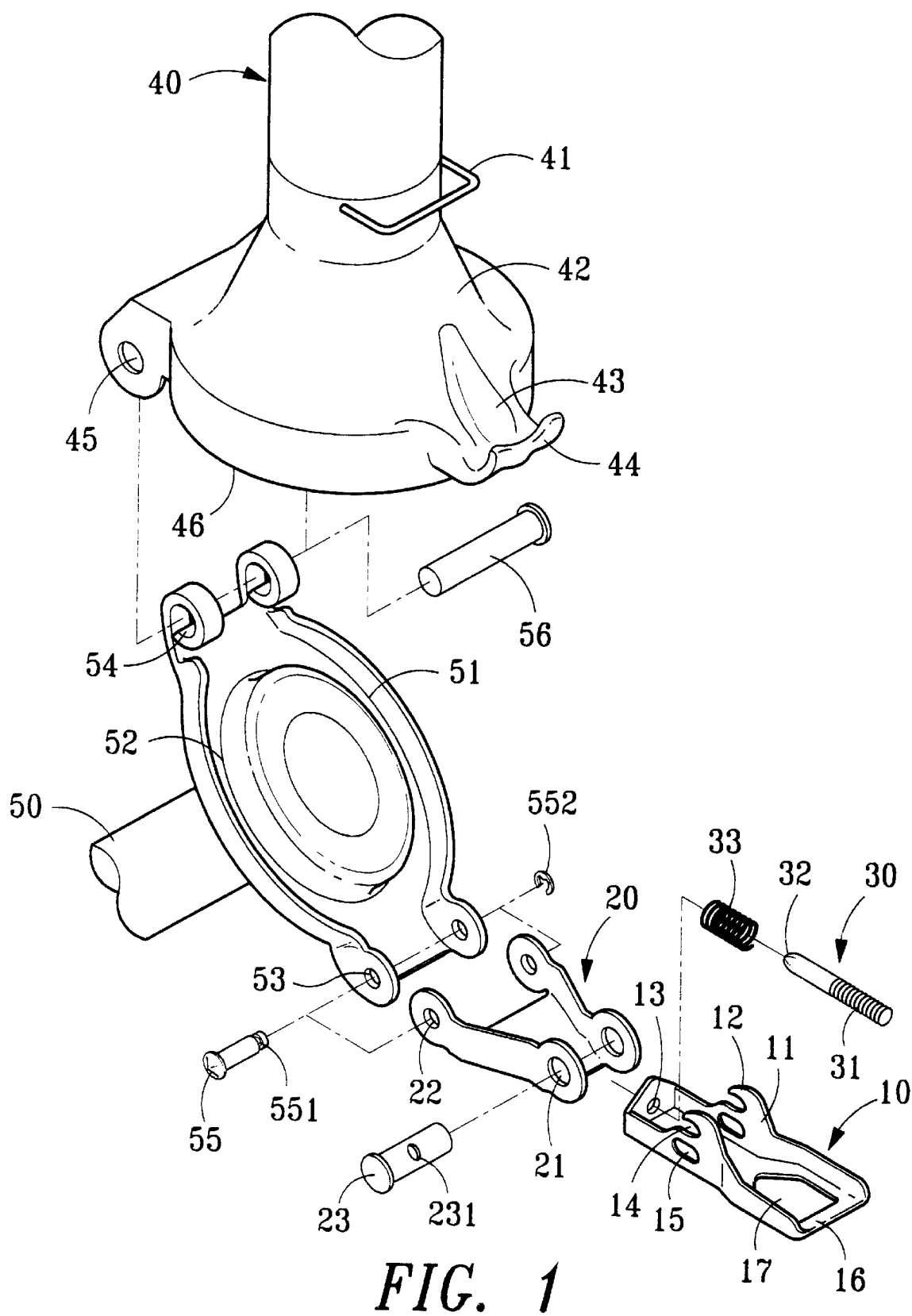
FIG. 1 is a three dimensions exploded view of the preferred embodiment according to the invention.

Symbols representing:

| 10 | upper grip | 20 | lower grip |
|---|---|---|---|
| 12 | hook | 21 | upper through hole |
| 13 | hole | 22 | lower through hole |
| 14 | mouth | 23 | connecting pin |
| 15 | elliptic hole | 231 | threaded hole |
| 16 | handle | 30 | adjustable set pin |
| 17 | pulling eye | 31 | threads |
| 32 | fixing end | 50 | lower tube base |
| 33 | spring | 51 | base disc |
| 40 | upper tube base | 52 | ring groove |
| 41 | hanger | 53 | inserting hole |
| 42 | circular adapter | 54 | fixing hole |
| 43 | depressed surface | 55 | supporting rod |
| 44 | holder | 551 | stopping groove |
| 45 | positioning hole | 552 | hook |
| 46 | contact rim | 56 | fixing rod |

DETAILED DESCRIPTION OF THE PREFERRED EMBODIMENT

Referring to FIG. 1, the mechanism for folding a bicycle according to the invention mainly comprises: an upper grip 10, a lower grip 20, an adjustable set pin 30, an upper tube base 40 and a lower tube base 50 wherein:

The upper grip 10 is of a U shaped trough like construction with the handle and the pulling eye 17 on its top portion while with the hole 13 at its bottom, two elliptic holes 15 are opened through both side walls of its middle portion and a hook 12 with a mouth 14 is provided in front of each elliptic hole 15.

The lower grip 20 is also of U shaped construction with the upper through hole 21 provided at each side of its upper portion while the lower through hole 22 is provided at each side of its lower portion. The upper and lower grips 10, 20 are linked together by means of the connecting pin 23 passing through the holes in such order; elliptic hole 15 →upper through holes 21→elliptic hole 15, in this way the upper grip 10 is able to turn around on the lower grip 20.

The upper tube base 40 is of a funnel-like structure with a hanger 41 mouthing on the appropriate location, the depressed surface 43 is provided in the front part of the depressed surface 43. Both on the right and left sides at the rear part of the circular adapter 42 a positioning hole 45 is from the contact rim 46.

On the lower tube base 50 there is the base disc 51 having a ring groove 52 surrounding along in its inner part. Two inserting holes 53 and two fixing holes 54 are provided in the front and rear parts of the base disc 51 respectively. The mutual latching between the lower and upper grips 20, 10 are accomplished by inserting the supporting rod 55 in the order beginning from lower through hole 22 passing through two inserting holes 53 and coming out of the other lower through hole 22 and then tightened with the clip 532 firmly to the stopping groove 551. Relative motion of the circular adapter 42 with respect to the base disc 51 is made possible by inserting the fixing rod 56 in the order beginning from a fixing hole 54 passing through two positioning holes 45 and coming out of the order other fixing hole 54.

The adjustable set pin 30 having the fixing end 32 at its end terminal is a screw rod with threads 31 and penetrates through the spring 33 and the hole 13 by turning the set pin 30, its extending length out of the hole 13 being able to be adjusted depending on the relative motion between the threads 31 and those of the hole 231.

FIG. 2 is a view showing the profile of the folder before folding in the preferred embodiment according to the invention, letting the contact rim 46 of the circular adapter 42 coupled to the ring groove 52 and the fixing end 32 of the adjustable set pin 30 in contact with the depressed surface 43 as shown on FIG. 3, and further pulling the upper grip 10 upwards with a finger inserting into the pulling eye 17, then bringing the hook 12 on the upper grip 10 towards the hanger 41 provided on the upper tube base 40, at this moment the spring 33 is in its compressed state. After the hook 12 having reached a position above the hanger 41, and the finger being released from the pulling eye 17 as shown on FIG. 4, the spring restores its normal state and the hook 12 engages tightly with the hanger 41 and both the upper and lower tube bases (40,50) latch closely together with each other as shown on FIG. 5.

In case of unfolding the only thing to do is to insert a finger into the pulling eye 17 and pull it upwards and outwards simultaneously and forcefully. The hook 12, spring 33 and hanger 41 in the embodiment according to the invention form the unit of secure mechanism which is able to assure the fixing end 32 of the be loosened accidentally by vibration.

In conclusion, the skillful newly developed bicycle folding mechanism according to the present invention is a product of the invention through a long term study, the product has many advantageous features such as simple in construction, convenient for handling being used to fold each part of the bicycle, low production cost, and free from loosing accidentally by vibration assuring perfect security to the users.

Many changes and modifications in the above described embodiment of the invention can, of course, be carried out without departing from the scope thereof According to promote the progress in science and the useful arts, the invention is disclosed and is intended to be limited only by the scope of the appended claims.

What is claimed is:

1. A mechanism for folding a bicycle, comprising:

an upper grip of a U shaped trough-like construction having a handle with a pulling eye on a top portion thereof, a hole provided at a bottom of said upper grip, two side wall each having an elliptic hole opened through a middle portion thereof, and a hook with a mouth provided in front of each of said elliptic holes;

a lower grip of a U shaped construction having two sides, wherein each of said sides has an upper through hole provided at an upper portion thereof and a lower through hole provided at a lower portion thereof, said upper and lower grips being linked together by means of a connecting pin which is passed through one of said elliptic holes, via said two upper through holes and coming out of said another elliptic hole, such that said upper grip is able to turn around on said lower grip;

an upper tube base of a funnel-like structure comprising a circular adapter which has a hanger mounting on a surface thereof, a depressed surface provided in a front part of said circular adapter, a holder provided in a front part of said depressed surface, two positioning holes respectively provided on a right and a left side of a rear part of said circular adapter, and a contact rim formed at a bottom periphery of said circular adapter;

a lower tube base comprising a base disc attached thereto, wherein said base disc has a ring groove surrounding along an inner part thereof, two inserting holes provided in a front part thereof, and two fixing holes provided in a rear part thereof, wherein a fixing rod is inserted through one of said two fixing holes of said base disc, said two positioning holes of said circular adapter, and then said another fixing hole of said base disc so as to enable relative motion of said circular adapter with respect of said base disc, wherein a supporting rod is inserted through one of said two lower through holes of said lower grip, said two inserting holes of said base disc, and then said another lower through hole of said lower grip so as to enable mutual latching between said lower and upper grips; and an adjustable set pin which is a screw rod with threads screwing to a thread hole provided on said connecting pin, said adjustable set pin having a fixing end at an end terminal thereof, wherein said fixing end of said adjustable set pin penetrates through a spring and said hole of said upper grip, therefore an extending length of said adjustable set pin out of said hole is adjustable by turning said adjustable set pin, depending on a relative motion between said threads of said adjustable set pin and said thread hole of said connecting pin;

when folding, letting said contact rim of said circular adapter coupled to said ring groove and said fixing end of said adjustable set pin in contact with said upper grip upwards with a finger inserting into said pulling eye and bringing said hook on said upper grip towards said hanger provided on said upper tube base, at this moment said spring being in compressed state, after said hook having reached position above said hanger and said finger being released from said pulling eye, said spring restoring a normal state thereof and said hook engaging tightly with said hanger and latching both said upper and lower tube bases.

\* \* \* \* \*